Nov. 5, 1940.                    S. OSTERMAN                    2,220,458
                          JUICE EXTRACTOR OR LIKE ARTICLE
                               Filed May 4, 1939
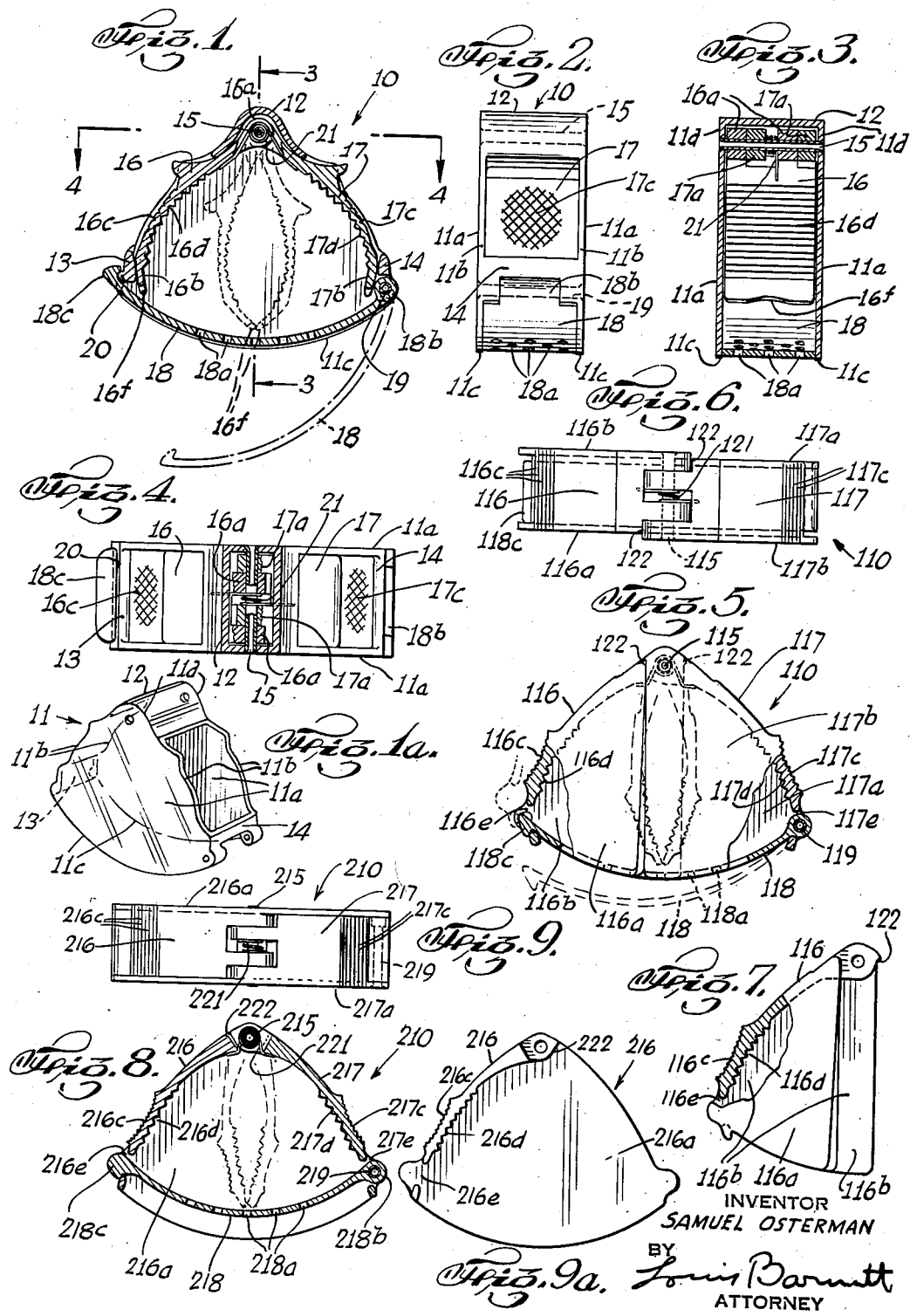

Patented Nov. 5, 1940

2,220,458

UNITED STATES PATENT OFFICE 2,220,458

JUICE EXTRACTOR OR LIKE ARTICLE

Samuel Osterman, New York, N. Y.

Application May 4, 1939, Serial No. 271,691

1 Claim. (Cl. 100—41)

This invention relates to juice extractors, hereinafter referred to as "dejuicers," and more particularly is directed to a sanitary device or household utensil for serving, by a squeezing or crushing action, extracted juices as a condiment or flavor for foods and beverages in preparing and during a repast, as for example, a device for squeezing sliced lemons, or the like, without contacting with the hands, to provide directly therefrom flavoring juice.

Among the objects of the invention is the provision of an improved sanitary device or household utensil of the character described which shall comprise few and simple parts that are easily assembled to form an attractively appearing kitchen and table article, which shall be easy and convenient to manipulate, and which shall be practical and efficient to a high degree in use.

Other objects of this invention will in part be obvious and in part hereinafter pointed out.

The invention accordingly consists in the features of construction, combinations of elements and arrangement of parts which will be exemplified in the constructions hereinafter described and of which the scope of application will be indicated in the following claim.

In the accompanying drawing in which is shown one of the possible illustrative embodiments of the invention and modifications thereof, Fig. 1 is a sectional view showing a juice extractor or "dejuicer" constructed to embody the invention adapted to serve lemon juice expressed from lemon slices, the gripper jaws thereof being shown in dotted lines when in a contracted position, and the strainer also being shown in dotted lines in a released open position.

Fig. 1a is a perspective view showing the housing or yoke frame of the improved "dejuicer."

Fig. 2 is a side elevational view of the improved juice extractor or "dejuicer" shown in Fig. 1.

Fig. 3 is a cross-sectional view taken on line 3—3 in Fig. 1.

Fig. 4 is a top plan view as seen from a cut taken on line 4—4 in Fig. 1.

Fig. 5 is a front elevational view of a modified form of juice extractor or "dejuicer" embodying the invention, partly broken away to expose the interior construction, and in part shown in dotted lines for illustrating the method of releasing the strainer.

Fig. 6 is a top plan view of the modification shown in Fig. 5.

Fig. 7 is a front elevational view of one of the two parts forming the juice extractor or "dejuicer" body shown in Figs. 5 and 6.

Fig. 8 is a cross-sectional view similar to Fig. 1 showing another modification embodying the invention.

Fig. 9 is a top plan view of the modified construction of juice extractor or "dejuicer" shown in Fig. 8, and Fig. 9a is a front elevational view of one of the two parts forming the juice extractor or "dejuicer" body shown in Figs. 8 and 9.

Referring in detail to the drawing 10 denotes a sanitary device or household utensil embodying the invention constructed for serving by squeezing or crushing action extracted juice as a condiment or flavor for foods and beverages, as for example, the provision of lemon juice direct from sliced lemons on fish, or the like juice as a flavor for tea or in the preparation of lemonade, and is particularly adapted for individual use during a repast at the table as well as for the preparation of meals in the kitchen. The improved construction of the device or "dejuicer" 10 not only provides an attractive household utensil as a convenient accessory to the setting of the tableware, but also has a sanitary appeal for serving fresh lemon juice directly from sliced lemons and the like juices as required.

The "dejuicer" 10 may be made of any suitable material, such as "Lucite," glass, porcelain or a suitable cellulose acetate, or pheno-condensate, preferably being molded. In the form here shown, said "dejuicer" 10 is of sufficient transparent construction to readily permit observation of the extraction or squeezing action in the manner heretofore described.

The "dejuicer" 10 as seen from Figs. 1 and 1a may comprise a frame housing or yoke 11 preferably molded in one transparent piece, having spaced substantially acute-angled circle sector shaped sides 11a. Edges 11b of each side 11a are tapered to extend from an arcuate or curved edge 11c and are joined in a rounded apex 11d, said sides 11a being rigidly aligned in a superimposed spaced relation by a saddle strap 12 which joins the rounded apices 11d and bands 13 and 14 spaced from each other and from the saddle strap 12. Said sides 11a, strap 12 and bands 13 and 14 form the frame member or yoke 11 into a rigid housing, as shown in Fig. 1a. The strap 12 and bands 13 and 14 as thus seen not only hold the sides 11a in spaced alignment relation but are preferably formed integral therewith, as molded braces in the yoke frame 11.

Mounted for swinging movement on a suitable hinge or pivot including a rivet 15 which extends through the apices 11d is a pair of gripper jaws 16 and 17. Said jaws may be of identical molded construction, shape, size and contour, the contour preferably corresponding to that of the side edges 11b so that when said jaws 16 and 17 are in their extended position they coincide substantially in outline with the edges 11b and when moved toward each other in close position, as shown in dotted lines in Fig. 1, they present a bowed structure for retaining squeezed or crushed lemon slices or the like (not shown) therebetween. The gripper jaws 16 and 17 may be made of a width to neatly fit and swing freely between the space frame sides 11a, said width preferably being sufficient to allow clearance of the thumb and forefinger of the hand of the user during the manipulation of said jaws 16 and 17. Said gripper jaws 16 and 17 are formed at one end of each with suitable hinge parts 16a and 17a, respectively, for pivoting on rivet 15, the free ends 16b and 17b of the jaws 16 and 17, respectively, being adapted to swing along a path just short of the arcuate edge 11c of the sides 11a. The rivet 15 may be of metal, such as stainless steel, Monel or other material having resistant properties to the effect of the juice being extracted.

Midway between the hinge parts 16a and 17a and the free ends 16b and 17b on the outer surface of each gripper jaw 16 and 17, respectively, are suitable finger rests 16c and 17c. These rests provide against slipping of the fingers and are shaped and finished to provide comfortable finger grips for manipulating said jaws.

Along the inner surfaces of jaws 16 and 17, corrugations or teeth 16d and 17d are provided to prevent slippage of the material being "dejuiced."

It should be noted that the yoke 11 forms a frame having adjacent openings between the sides 11a through which access is had for manipulating the jaws 16 and 17 within the yoke. There also is an opening between said sides 11a along the path of movement of the free ends of the jaws 16 and 17 which serves as an outlet for the device.

Where it is desirable to retain pulp, seeds and other loose particles from the material from which the juice is being extracted, from falling or dripping into the food or beverage, a suitable strainer 18 having through perforations 18a may be provided, said strainer being shaped to conform to the contour of the edge 11c of the sides 11a and may be pivoted at one end 18b on rivet 19 adjacent to the band 14 at the junction of one of the edges 11b with the edge 11c. Said rivet 19 may be made of material similar to that described above for rivet 15. The free end of the strainer 18 may be provided with a hook 18c which latches with a suitable engaging ledge 20 extending from an outer edge of the band 13 so that when the strainer 18 is moved to the closed position, the hook 18c engages the ledge 20 and retains the strainer 18 in position for holding any loose material from passing during the manipulation of the jaws 16 and 17.

The gripper members 16 and 17 and strainer 18 may be made of the same transparent material as that of the yoke 11, or if desired may be made of an opaque plastic, metal or "Bakelite" of contrasting finish with respect to the yoke 11. The contours of the sides of the yoke 11 and the jaws 16 and 17 may also be formed of any pleasing design in straight, curved or of a composition outline such as shown in Fig. 1.

The operation and utility of applicant's invention will now be apparent. After molding the frame yoke 11, preferably as a single structure, the identical jaws 16 and 17, and strainer 18, the jaws 16 and 17 are mounted for swinging movement within the yoke on the rivet 15. It is desirable to provide a suitable spring 21 fitted between the hinged ends 16a and 17a and around the rivet 15 for pressing said jaws to their extended position as shown in full lines in Fig. 1. The saddle strap 12 or any other suitable means may be provided for confining the movement of said jaws 16 and 17 within the limits of the side edges 11c.

When the device 10 is used for squeezing slices of lemon, such a slice (not shown) is inserted between the yoke sides 11a and the jaws 16 and 17 with said jaws in their extended position in any well understood manner. By grasping the device 10 with the thumb and forefinger on the finger grips 16c and 17c of the jaws 16 and 17, the jaws are pressed towards each other against the action of spring 21, the free ends 16b and 17b of the jaws 16 and 17 being directed towards the place where the juice is desired. The saddle strap 12 is thus seen to serve as a shield so as not to pinch anything in the hinged ends of the jaws 16 and 17 and particularly protects the web of the user's hand between the forefinger and the thumb.

When it is desired to provide the device 10 with a strainer for the extracted juices, the same may be applied by pivoting the strainer end 18b on the rivet 19 and releasably locking the hook 18c on the free end of the strainer on the projecting ledge 20. The strainer 18 may be swung open for inserting or removing the material being "dejuiced" as shown in dotted lines in Fig. 1 and is latched during the "dejuicing" process.

In Figs. 5, 6 and 7 there is shown the modified form of juice extractor 110 constructed to embody the invention. Here instead of having a rigid yoke 11 as in the construction of the device 10, jaw members 116 and 117 are provided with spaced side extension portions 116a, 116b and 117a, 117b, respectively. These portions serve to enclose the material being "dejuiced" and provides a simpler and consequently cheaper construction than that shown in Figs. 1 to 5 inclusive, above described, where a yoke is employed.

The juice extractor 110 as seen from Figs. 5 and 6 has the jaw members 116 and 117 hinged together at one end on a suitable rivet 115. A suitable spring 121 may be provided for resiliently holding the jaws in their extended position. Suitable means for limiting the outward movement of the jaws away from each other may be provided and as here shown, such means may be in the form of stop projections 122 adjacent the hinge. Each of the jaw members 116 and 117 has its side extension portions 116a, 116b and 117a, 117b, respectively, of unequal size and as seen from Fig. 6, the smaller side 116a is adapted to swing in close proximity to the wide extension portion 117b while the narrow side 117a is adapted to swing in close proximity to the wider side 116a. By providing this inequality in the sizes of the extension portions, the main portions of the jaws between the extension portions 116a, 116b and 117a, 117b are permitted to be swung in closer relation than would otherwise be possible. These jaw members 116 and 117 with their respective extension portions, as shown from Fig. 7, are preferably each made of one transparent molded piece and are identical in size, shape and contour.

The jaw members 116 and 117 may each be provided with finger grips 116c and 117c, respectively, on their outer surfaces, and the inner surfaces of said members may be provided with corrugations or teeth 116d and 117d, respectively, to prevent slippage of the material being "dejuiced."

With the form of the construction for the juice extractor 110 described above, a strainer 118 may be provided with suitable through perforations 118a. This strainer may be hinged on a pivoted rivet 119, as shown in Fig. 5, the free end of said strainer being provided with a hook end 118c which is adapted to pass through the slotted opening 116e in the jaw 116 which is similar to the corresponding slot opening 117e provided in the jaw 117 which permits the free movement of the pivoted end of the strainer 118 on the rivet 119, as shown in Fig. 5.

The juice extractor 110 is used in the manner similar to that described above for the juice extractor 10 with the exception that in order to release the strainer 118, the jaws 116 and 117 are gently swung apart until the hook 118 is released, as is clearly indicated in dotted lines in Fig. 5.

In Figs. 8 to 9a, inclusive, another modification of juice extractor 210 embodying the invention, is shown. This, like juice extractor 110, is of a simple and cheap construction.

The juice extractor 210 is also constructed without a rigid yoke for assembling the jaw members 216 and 217 and distinguishes from the construction of the juice extractor 110, described above, by having each jaw formed with only a single side extension portion 216a and 217a, respectively, said jaws with their respective extension portions being identical in size, shape and contour. The upper ends of these extension portions are hinged together on a pivoting rivet 215 and the said portions 216a and 217a are held in their aligned positions by a suitable spring 221 as is clearly shown in Figs. 8 and 9.

Suitable stop means 222 at the hinges may be provided for limiting the outward movement of said members. Said members 216 and 217 are provided with suitable finger gripping means 216c and 217c on their outer surfaces and corrugations or teeth 216d and 217d on the inner surfaces, similar to those described above for juice extractors 10 and 110.

Where it is desired to have a strainer 218 incorporated in the construction of the juice extractor 210, the same may be provided with through perforations 218a, as shown in Fig. 8, said strainer 218 being pivoted at one end on the jaw member 217 on a pivoted rivet 219 and may releasably engage the jaw member 216 by means of the hook end 218c, said hook end passing through a slot 216e which corresponds to a similar slot 217e in which the hinged end 218b of the strainer freely swings. The juice extractor 210 is manipulated in the same manner described above for juice extractor 10.

When these juice extractors 10, 110 and 210 are finger manipulated to squeeze or crush a slice of lemon, they are so shaped that they form a bowed structure to retain the material therebetween and when strainers are used, only the juice is permitted to pass through these juice extractors. As seen from the drawing, the juice extractors embodying the invention are neat and attractive in appearance and form a desirable accessory for the table or aid in preparing food for service in the kitchen in a sanitary manner. The devices are also simply constructed and easily manipulated and when used as above described, enclose the material being "dejuiced" so as to be squirt-proof no matter how carelessly handled.

As seen from the drawing, the similarly constructed jaws 16 and 17, or 116 and 117, or 216 and 217 each have squeezer portions that are bow shaped and formed with convexed exterior surfaces, each carrying a finger seat 16c, 17c, or 116c, 117c, or 216c, 217c, respectively, and formed with concaved interior surfaces each provided with corrugations 16d, 17d, or 116d, 117d, or 216d, 217d, respectively, which serve as friction means for the purposes above described.

If desired, each of the jaws 16, 17, 116, 117, 216 and 217 may be cut away at the free ends at 16f thereof to prevent the ready draining of the extracted juice from between said jaws.

It will thus be seen that there is provided means whereby the several objects of this invention are achieved and which are well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

A device of the character described including two squeezer jaws hinged together at one end for co-action to permit moving the free ends towards and away from each other, said jaws inwardly curved toward each other forming a bowed structure for gripping and retaining an article being dejuiced therebetween, means on the exterior of each of said jaws midway said hinged and free ends for finger manipulation, and strainer means extending along the path of movement of the free ends of said jaws displaceable from its effective position to permit insertion of the article to be dejuiced between said jaws, and means cooperative with said jaws and located adjacent the edges thereof to prevent the juice from squirting laterally and to positively direct said juices toward said free ends.

SAMUEL OSTERMAN.